Patented Sept. 15, 1931

1,823,119

UNITED STATES PATENT OFFICE

ALEXANDER A. NIKITIN, OF PASSAIC, NEW JERSEY, ASSIGNOR TO THE NAUGATUCK CHEMICAL COMPANY, OF NAUGATUCK, CONNECTICUT, A CORPORATION OF CONNECTICUT

PRESERVATION OF LATEX

No Drawing.     Application filed March 20, 1929. Serial No. 348,674.

This invention relates to a method of preserving latex of rubber and similar materials such as balata etc., and particularly acid latices, and to the product thereof.

In the employment of stabilizing agents such as those set forth in patents to McGavack et al. Nos. 1,699,368, and 1,699,369, issued on Jan. 15, 1929, a condition of low or weak acidity is necessary and therefore the stabilizers have a limited use. If an acid having an acidity stronger than sulphonic is used, such as HCl or $H_2SO_4$, the creation of an acidity below pH4.5 tends to throw out or interfere with the stabilizing function of the acid latex stabilizers mentioned in the cited patents.

It has now been found that the saponins and similar glucosides, such as arbutin and salicin, will act as protective colloids for latex on the acid, as well as on the alkaline side of neutrality and particularly that the property of saponin of preserving or stabilizing acid latex will prevail throughout a range of hydrogen ion concentration in the latex of increasing acidity from pH7 to pH1 and lower. Acid latex when stabilized by saponin, can be converted into a rubber product with all the advantages of that claimed for rubber derived from latex treated according to the processes in the above mentioned patents to McGavack et al. Again the use of saponin enables the introduction of zinc oxide and other fillers into an acid latex with greater ease.

Accordingly the invention comprises treating rubber latex with saponin and an agent which will carry the reaction to the acid side of neutrality above or below pH4.5, without substantial modification of the colloidal condition of the rubber hydrocarbon. The amount of saponin to be used may be varied and depends upon the acidity desired in the resulting latex, and the concentration of the latex. Good results have been obtained with from ½ to 4 parts per 100 parts of rubber in the latex. The invention includes within its scope the treatment of natural rubber latex as it is received after tapping, as well as latex which has been preserved by means of the addition of an alkaline preservative, stabilizer, etc. Although particular embodiments are given, it is with the understanding that these are to be regarded in the light of examples, and not as limitations.

As an illustration of the invention 1000 c. c. of natural latex (about 36% solids) are treated with 2.5 parts by weight of saponin in 10% aqueous solution per 100 parts by weight of rubber in the latex. To the latex is also added 10-15 c. c. of dilute (approximately 20%) hydrochloric acid. The latex is stable and has an acid reaction. Instead of hydrochloric, any acid, mineral or organic, can be used and added to the latex without danger of coagulation.

When treating ammonia preserved latex instead of natural untreated latex it is necessary to remove the ammonia or nullify its effects. This may be accomplished in any of the various ways described in Patent No. 1,699,368, and the saponin may be added prior to, simultaneously with, or after the removal or conversion of the ammonia. After the treatment with saponin the latex can be treated with any material capable of carrying the reaction of the latex to the acid side of neutrality such as hydrochloric, sulphuric, or other similarly strong acids, the acid salts or salts which hydrolyze to give an acid reaction, acetic or other similarly weak organic acids, formaldehyde, in fact any mineral or organic substance capable of creating an acid condition in latex. Where there is a prior conversion of or reaction upon ammonia, by formaldehyde or acid material to form other products, the saponin may be added after the addition of the formaldehyde or acidic materials. Also natural latex which undergoes acid putrefaction may be treated with the saponin.

The expression "uncoagulated" is used to indicate a condition of substantially no coagulation, that is, no substantial change in the colloidal condition of the rubber hydrocarbon, and the expression excludes those partial stages of coagulation which are not visible to the naked eye but which may be clearly seen under the microscope.

With the detailed disclosure above given, it is obvious that modifications will suggest

Having thus described my invention, what I claim and desire to protect by Letters Patent is:

1. As a new product, a stable uncoagulated rubber latex having a pH less than 4.5.

2. As a new product, a stable uncoagulated rubber latex having a pH not higher than 7 and containing a glucoside selected from the group comprising saponin, arbutin and salicin.

3. As a new product, a stable uncoagulated rubber latex having a pH not higher than pH7 and containing saponin as a stabilizer.

4. As a new product, a stable uncoagulated rubber latex having a pH less than 4.5, and containing saponin as a stabilizer.

5. As a new product, a stable uncoagulated latex containing saponin as a stabilizer and containing a small amount of acidic material.

6. As a new product, a stable uncoagulated latex containing saponin and a small amount of a strongly acid material.

7. A method of treating latex which comprises adding saponin to latex, and adding an acidic material thereto to carry the reaction of the latex to the acidic side of neutrality to produce a stable uncoagulated acid latex.

8. A method of treating latex which comprises adding saponin to latex, and adding a strongly acidic material thereto to carry the reaction of the latex to the acidic side of neutrality to produce a stable uncoagulated acid latex.

9. A method of treating latex which comprises treating latex with saponin and an acidic material to furnish a stable uncoagulated latex having a pH not higher than pH7.

10. A method of treating latex which comprises treating latex with saponin and an acidic material to furnish a stable uncoagulated latex having a pH less than 7.

11. A method of treating latex which comprises treating latex with saponin and an amount of strongly acidic material sufficient to impart a pH less than 4.5, to produce a stable uncoagulated acid latex having a pH less than 4.5.

12. A method of converting stable uncoagulated alkaline preserved latex into a stable uncoagulated acid latex which comprises treating the alkaline latex with saponin, nullifying the effect of the alkaline preservative, and treating said latex with an acidic material to impart a pH less than 7.

13. The method of converting stable uncoagulated alkaline preserved latex into a stable uncoagulated acid latex which comprises treating the alkaline latex with saponin, disposing of the alkaline preservative, and adding an amount of acidic material to impart to the latex a pH not higher than 7.

14. Method of converting stable uncoagulated alkaline preserved latex into a stable uncoagulated acid latex which comprises treating an alkaline latex with saponin, nullifying the effect of the alkaline preservative and treating said latex with an amount of strongly acid material sufficient to impart a pH less than 4.5.

Signed at Passaic, county of Passaic, State of New Jersey, this 12 day of March, 1929.

ALEXANDER A. NIKITIN.